(No Model.)
H. N. BULL, D. DICKEY & H. F. HUTTON.
SNAP HOOK.
No. 470,980. Patented Mar. 15, 1892.
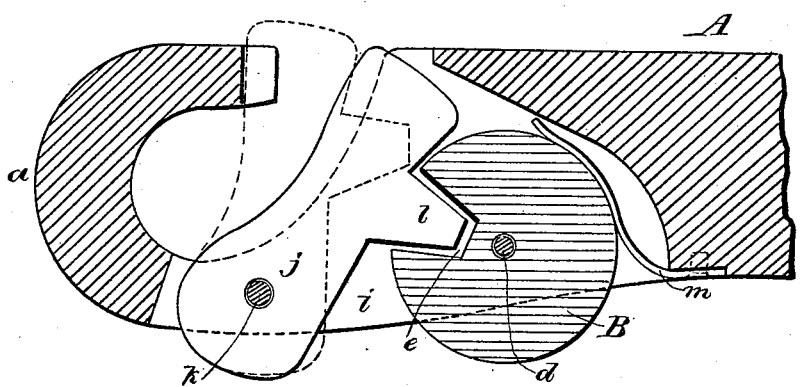
WITNESSES:
F. McArdle
C. Sedgwick
INVENTORS:
H. N. Bull
D. Dickey
H. F. Hutton
ATTORNEYS

UNITED STATES PATENT OFFICE.

HORACE N. BULL, DAVID DICKEY, AND HOMER F. HUTTON, OF ENNIS, MONTANA.

SNAP-HOOK.

SPECIFICATION forming part of Letters Patent No. 470,980, dated March 15, 1892.

Application filed May 5, 1891. Serial No. 391,612. (No model.)

*To all whom it may concern:*

Be it known that we, HORACE N. BULL, DAVID DICKEY, and HOMER F. HUTTON, all of Ennis, in the county of Madison and State of Montana, have invented a new and Improved Snap-Hook, of which the following is a specification, reference being had to the annexed drawing, forming a part thereof, in which is represented a longitudinal section of the hook.

Our invention is an improvement in the class of snap-hooks which are provided with a pivoted device for locking a trace-loop or chain-link and in the hook proper. The body A of the snap-hook has a hook proper $a$, which is provided with a notch in its terminal or point. In the shank of the hook is formed a lengthwise mortise, in which a latch $j$ is pivoted on a transverse pin $k$. The back of the latch is constructed with a beveled projection or lug $l$, and in rear of the latch is pivoted a disk B, having a peripheral notch $e$, adapted to receive the said lug $l$. When the latch $j$ is open, its lug $l$ rests in the notch of said disk, as shown by full lines; but when pushed forward to close the hook $a$, as shown by dotted lines, it is held in such position by contact of its lug $l$ with the periphery of the disk, which is for that purpose turned on its axis $d$. The disk is held in such position by a friction-spring $m$, arranged to bear on its periphery, as shown. It is obvious that the latch $l$ will be released and the hook unlocked by rotating the disk back so as to bring its notch again into coincidence with the lug $l$. It will be noted that the edge of the disk B projects below the shank of the hook, so that it is easily accessible for rotating it, as required.

What I claim is—

The combination, with the hook having the lengthwise mortise in its body and a notch on its end, of the latch $j$, pivoted in said mortise and having the lug $l$ in its rear side, the disk B, pivoted in rear of the latch and having a slot to receive its lug, and a spring bearing on said disk, as shown and described, to operate as specified.

HORACE N. BULL.
DAVID DICKEY.
HOMER F. HUTTON.

Witnesses:
JOHN M. BAKER,
RAY SMITH.